United States Patent
Brothers (10) Patent No.: US 7,075,681 B1
(45) Date of Patent: Jul. 11, 2006

(54) SYSTEM AND METHOD FOR REDUCING THE DATA VOLUME OF IMAGES

(75) Inventor: Kent Montgomery Brothers, North Vancouver (CA)

(73) Assignee: Kodak Graphic Communications Canada Company, Burnaby (VG)

( * ) Notice: Subject to any disclaimer, the term of this patent is extended or adjusted under 35 U.S.C. 154(b) by 983 days.

(21) Appl. No.: 09/710,183

(22) Filed: Nov. 9, 2000

Related U.S. Application Data (60) Provisional application No. 60/164,666, filed on Nov. 9, 1999.

(51) Int. Cl.
    *H04N 1/32* (2006.01)
(52) U.S. Cl. ............... 358/426.01; 358/515; 358/523; 358/524; 358/518; 382/166; 382/232; 708/203
(58) Field of Classification Search ............... 382/232, 382/166, 239, 173, 243, 244, 162, 296, 167, 382/261, 176; 358/1.6, 462.13, 1.9, 3.01, 358/513–524, 426.01, 453, 448; 375/240.24; 349/73; 345/589–605, 555; 348/384.1; 708/203
    See application file for complete search history.

(56) References Cited

U.S. PATENT DOCUMENTS

| | | |
|---|---|---|
| 4,189,711 A | 2/1980 | Frank |
| 4,509,195 A | 4/1985 | Nadler |
| 4,656,515 A | 4/1987 | Christopher |
| 4,956,869 A | 9/1990 | Miyatake et al. |
| 5,070,532 A | 12/1991 | Faul et al. |
| 5,074,597 A | 12/1991 | Mancuso et al. |
| 5,127,064 A | 6/1992 | Flinois et al. |
| 5,222,158 A | 6/1993 | Takasaki et al. |
| 5,247,590 A | 9/1993 | Fukuhara et al. |
| 5,259,042 A | 11/1993 | Matsuki et al. |
| 5,408,542 A | 4/1995 | Callahan |
| 5,430,555 A | 7/1995 | Sawada et al. |
| 5,526,445 A | 6/1996 | Smutek et al. |
| 5,552,898 A | 9/1996 | Deschuytere |

(Continued)

FOREIGN PATENT DOCUMENTS

| | | |
|---|---|---|
| WO | WO 96/39682 | 12/1996 |

*Primary Examiner*—Thomas D. Lee
*Assistant Examiner*—Heather D Gibbs (57) ABSTRACT

A system and method for reducing the volume of data necessary to represent an image by utilizing tiling and masking techniques is disclosed. Initially, an image described by raster content having an original number of bits per pixel is provided. The image is divided into tiles such that each of the tiles represents a portion of the image. Then, for each of the tiles, the following steps are performed: (a) the colors in the tile are identified; (b) the required number of masks are compared to a threshold number of masks to determine if data reduction by using masks is worthwhile; (c) if the required number of masks is less than the threshold number of masks, a representation of the tile is generated using fills and/or masks; and (d) if the required number of masks is greater than or equal to the maximum number of masks, a representation for the tile using the original format and number of bits per pixel or a smaller index is generated.

44 Claims, 6 Drawing Sheets

U.S. PATENT DOCUMENTS

| | | |
|---|---|---|
| 5,615,287 A | 3/1997 | Fu et al. |
| 5,619,591 A | 4/1997 | Tsang et al. |
| 5,630,036 A | 5/1997 | Sonohara et al. |
| 5,659,631 A * | 8/1997 | Gormish et al. ............ 382/166 |
| 5,699,122 A | 12/1997 | Jung |
| 5,757,382 A | 5/1998 | Lee |
| 5,758,042 A | 5/1998 | Deschuytere |
| 5,805,734 A | 9/1998 | Ebner |
| 5,845,013 A | 12/1998 | Bouchard et al. |
| 5,854,857 A | 12/1998 | de Queiroz et al. |
| 6,128,406 A * | 10/2000 | Ostrovsky ................... 382/166 |
| 6,549,657 B1 * | 4/2003 | Ohta et al. ................... 382/173 |
| 6,728,398 B1 * | 4/2004 | Hondl ........................ 382/162 |

\* cited by examiner

SYSTEM AND METHOD FOR REDUCING THE DATA VOLUME OF IMAGES

RELATED APPLICATIONS

The present invention claims priority under 35 U.S.C. § 119(e) to provisional application Ser. No. 60/164,666, filed on Nov. 9, 1999, the disclosure of which is hereby expressly incorporated by reference.

FIELD OF THE INVENTION

The present invention relates generally to data reduction techniques for digitized images and, more particularly, to data reduction utilizing different image representation techniques for different parts of the image.

BACKGROUND OF THE INVENTION

Digital imaging systems have improved the process of creating, editing and rendering images. In particular, such systems have decreased the amount of processing time necessary to produce a final product. Nonetheless, the ability of digital imaging systems to process and, particularly, to render images is limited by the memory capacity of the systems.

In digital imaging systems, an image is often divided into fixed spatial coordinates on a rectangular grid where each sample point has one color and is referred to as a picture element, commonly known as a pixel or a "dot" (not to be confused with the halftone dot used in the printing industry). Such an image is usually referred to as a raster image and is typically represented and stored in a format which uses one or more bits per pixel to identify the color of each pixel. The total amount of data necessary to represent an image depends on several factors, some of which include the image size, the resolution of the image, and the number of bits per pixel.

Large high-resolution images, particularly those containing "continuous tone" or "contone" content (i.e., 8 or more bits per color component per pixel), require an extensive amount of data to represent the images. Because imaging rendering devices have a limited memory and processing capacity, such large high-resolution images often place a demand on the image rendering devices that exceeds their image rendering capabilities. As an example, a Raster Image Processor (RIP) would typically not be able to handle the volume of data in a printing format of a 1200 dot per inch (dpi) image file represented in contone raster format, such as what might be required for imaging data for a map. For example, a standard printing form sized 32 inches by 44 inches full of 1200 dpi, 8 bits-per-pixel images would require about 2 gigabytes of memory, well beyond that available on most rendering/RIP workstations. However, in many practical applications, the image consists of some photographic content and a large portion of "line work", i.e., text or geometric objects which delineate areas of constant color which are amenable to representation with a small number of bits per pixel.

Therefore, a need exists for a method of reducing the volume of data representing such high resolution images so that the images can be adequately processed and rendered in digital imaging systems.

SUMMARY OF THE INVENTION

The present invention provides a system and method of reducing the volume of data required to represent an image by "tiling" the image (i.e., subdividing the image into smaller, preferably rectangular areas) and representing each tile using a "fill" operation and/or one or more 1-bit-per-pixel masks, or by representing each tile with an indexed image when such a representation of the tile requires fewer bits per pixel than in the original image.

Specifically, a digital image described by raster content encoding the pixels using an original number of bits per pixel is initially provided. The image is then divided into smaller sub-areas or tiles. Each of the tiles is individually analyzed to determine whether a data volume savings is worthwhile if the techniques of the present invention is utilized. In particular, this is accomplished by comparing the required number of masks necessary to represent the tile to a threshold number of masks, typically set equal to the original number of bits per pixel representing the image or predetermined to be some smaller number deemed to result in a worthwhile data volume savings. Furthermore, the threshold number of masks can be predetermined or user-defined via a user input or a system configuration setting. If the required number of masks is less than the threshold number of masks, meaning that a data volume savings is possible and worthwhile, a representation for the tile using fills and/or masks is generated. Otherwise, a representation using the original number of bits per pixel or using an indexed image requiring fewer bits per pixel for the tile is used.

In the following description, it will be appreciated that a representation of an image may specify a "default" color (typically white but also commonly colorless) so that any pixel which has that color does not need to be represented explicitly. In particular, there is no need to explicitly represent the pixels in a tile that have the default color, and if a tile consists entirely of the default color, then it requires no representation at all.

In accordance with other aspects of the present invention, to represent the tile using fills and/or masks, a test is made to determine whether there are no default-colored pixels in the tile (a determination based on the image) and whether a non-default background color should be chosen (a user option). If there are default-colored pixels in the tile or if a non-default background color should not be chosen, the default is selected as the background color. On the other hand, if there are no default-colored pixels in the tile and a non-default background color should be chosen, a non-default color is selected as the background color and a representation is generated to fill the tile with the selected non-default background color. Then, if there are any non-background colors, for each such color, a representation is generated for the pixels in an area of the tile using a 1-bit-per-pixel mask. The area of the mask can be defined by the boundaries of the tile or, alternatively, it can be a minimally sized area within the tile in which pixels of the current color are located.

In accordance with further aspects of the invention, instead of testing whether there are no default-colored pixels and whether a non-default background color should be chosen before actually selecting the background color, other various criteria can be used to select the background color. For example, in one embodiment, the test could query whether there are only a few default-colored pixels in the tile. If there are only a few and default-colored pixels can be explicitly represented (a function of the representation system or conditions established prior to rendering the image), then a non-default background is selected and a representation is generated to fill the tile with the selected non-default background color as described above. However, if there are a large number of default-colored pixels in the tile, the default is selected as the background color. In another embodiment, the test could simply query whether there are any default-colored pixels in the tile without testing whether a non-default background should be chosen. In this case, if there are no default-colored pixels in the tile, a non-default background will be selected. If there are any default-colored pixels, a default background is selected. In yet another embodiment, a background color is simply selected and, if it needs to be rendered, instructions to fill the tile with that color are generated. In still another further alternative embodiment, a background color is not chosen at all and the tile is represented using masks alone, if a data savings was deemed achievable by use of such masks.

In accordance with still further aspects of the invention, if the required number of masks to represent the tile is greater than or equal to the threshold number of masks, a representation is generated for the tile using the original number of bits per pixel provided by the original raster content. In one embodiment, the original format and number of bits per pixel are used to represent the entire tile. However, in an alternative embodiment, the original format and number of bits per pixel can be used only in a minimal area within the tile. In this case, the tile is examined to determine which color, if chosen as a background color for the tile and represented as such, would cause the remaining colors to be located in the smallest sized rectangular area within the tile. Once this determination is made, a representation is generated for the tile with the identified color as a background and using the original format and number of data bits to represent the remaining colors in the image within the identified rectangular area in the tile.

In yet another alternate embodiment where the required number of masks to represent the tile is greater than or equal to the threshold number of the masks, just as the original image may have been represented using an index, the tile may be represented such that the value of each pixel is encoded as an index which references a table of the colors in the tile (as distinct from the entire image) as will be appreciated by those skilled in the art and others. For example, if there are 16 or fewer colors in the tile then a 4-bit index is sufficient to identify the color so that only 4 bits per pixel are required for the tile. In this embodiment, a test can be performed to indicate whether a data savings can be achieved using the index as compared to using the original bits per pixel for the tile. If so, an index is used to represent the colors in the tile. If not, the original bits per pixel are used.

In accordance with still yet another alternative embodiment rather than initially using the techniques of fills and/or masks to reduce the data volume of an image, a technique of indexing tiles in the image could be used. In this case, the original image is first divided into tiles. Then, for each tile, the colors are identified and a test is performed to determine whether a data savings can be achieved using an indexed representation for the tile. If so, the tile is represented using an index. If not, the tile is represented using the original bits per pixel.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method that reduces the volume of data required to represent an image by utilizing tiling, masking, and/or indexing techniques.

Figure 1:
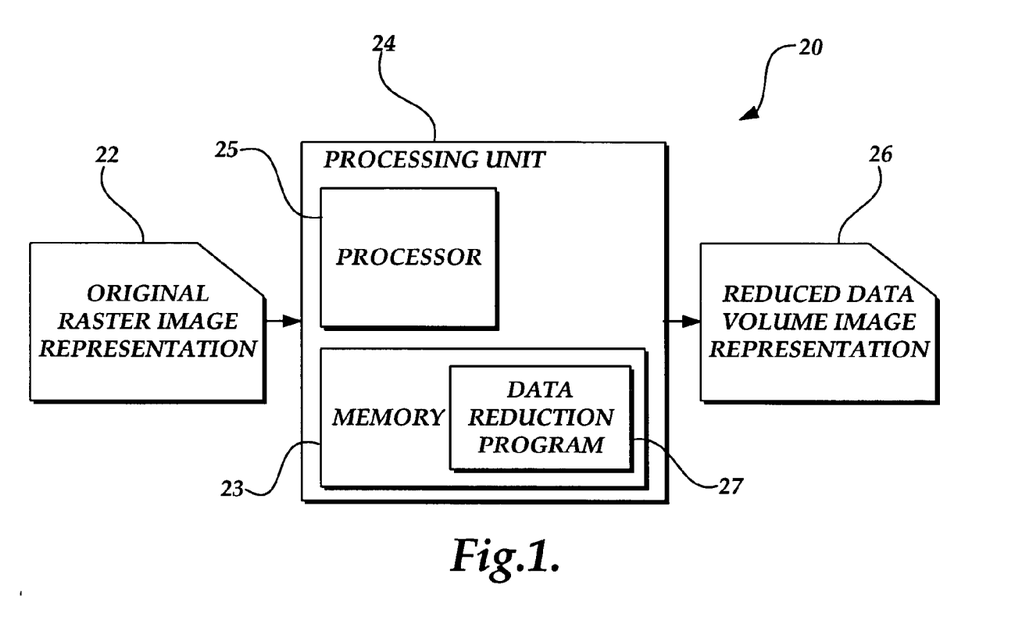
FIG. 1 is a block diagram of a system in which the present invention is implemented.

FIG. 1 is a simplified block diagram of a system 20 in which the present invention is implemented. As will be described in further detail below, the system 20 includes a processing unit 24 that receives and processes an original digital image 22 in accordance with the present invention. The original image 22 is created using methods well known in the art. The original image 22 is stored in a computer-readable file having a file format for representing bit-mapped graphic data either directly or in an indexed manner. Examples of such file formats include tagged image file format (TIFF), TIFF for Information Technology (TIFF/IT), Scitex (Handshake or native) Line Work (LW), and others. In such formats, the original digital image includes a plurality of pixels. Each of the pixels in the original image is represented by an original number of data bits, which may be an index, necessary for describing the characteristics of the pixel, such as color.

Initially, the original image 22 is transmitted to the processing unit 24 from any data source including, but not limited to, a local data source such as a computer workstation or server directly connected to the processing unit, a remote data source, or a computer-readable medium storing the original image such as a floppy disk. In this regard, the processing unit 24 includes an input/output port for receiving the transmitted original image 22. Alternatively, the original image 22 can simply be stored on and retrieved from memory of the processing unit 24.

The processing unit 24 also includes a memory 23 for storing data and instructions necessary for reducing the volume of data representing the original digital image and a processor 25 for executing the instructions. More specifically, the memory 23 stores a data reduction program 27 formed in accordance with the present invention for reducing the volume of data representing the original image by using tiling, masking and/or indexing techniques. Once the processor 25 executes the data reduction program 27, a reduced-data-volume digital image 26 is produced. The reduced-data-volume digital image 26 can then be transmitted to another device for further processing or may be further processed by the processing unit 24.

It will be appreciated by those skilled in the art and others that the processing unit 24 can be a general purpose computer workstation or can be located within a Raster Image Processor (RIP) or any image rendering device. Accordingly, the reduced data volume digital image 26 may be directly transferred to other processes typically implemented by any of these devices.

As will be described in further detail below, the data reduction program 27 reduces the volume of data necessary to represent an image, in a format such as PostScript or Portable Document Format (PDF) which accommodates a mixture of raster formats, by using tiling, masking, and/or indexing techniques. Generally, the image is divided into smaller sub-areas or tiles. Each of the tiles is then individually analyzed to determine whether a data volume savings is possible and worthwhile. This is essentially accomplished by comparing the number of bits per pixel required to represent the tile if the data reduction methods of the present invention are utilized with the original number of bits per pixel describing the image or some other threshold. If a data volume savings is possible and worthwhile, the data reduction methods of the present invention are used. Preferably, a background color for the tile is chosen and a representation for filling the tile with the background color is provided. It will be appreciated by those skilled in the art and others that if there is a default color which is the background color, no data or instructions are necessary to fill the tile with this color. Then, a representation is generated for identifying any remaining non-background colors in the tile using masks or an indexed representation.

In this description, the "color" of a pixel is not necessarily restricted just to an intensity for each component of a color space such as red-green-blue (RGB) or cyan-magenta-yellow-black (CMYK), but can also include degrees of transparency or other properties. In particular it is important to distinguish between truly "white" pixels and "colorless" pixels (sometimes called "transparent") which may either become white by being rendered onto a white medium or become some other color by being rendered onto some other medium or some other image.

Even further, it will be appreciated that a representation of an image may specify a "default" color (typically white but also commonly colorless) so that any pixel which has that color does not need to be represented explicitly. In particular, there is no need to explicitly represent the pixels in a tile that have the default color, and if a tile consists entirely of the default color, then it requires no representation at all. In addition, a given tile may be designated with a "background" color, which is typically the dominant color in the tile. If the background color differs from the default color, it is necessary to explicitly represent this background color, typically with a "fill" instruction which requires negligible storage, and then all pixels in that tile are taken to be that color unless explicitly specified otherwise, e.g., by a "mask" which indicates which pixels are some other particular color. More precisely, a mask is a 1-bit-per-pixel raster image. A mask is applied to an area of an image by first selecting a color and then, for each pixel of the mask which has the value 1, the corresponding pixel of the image area to which the mask is applied is changed to the selected color. For each pixel of the mask which has value 0, the corresponding pixel of the image area is left unchanged. It will be appreciated by those skilled in the art and others that the roles of the values 0 and 1 may be exchanged in a particular implementation. Note that in some picture representation systems (including PostScript and PDF) the only pixels which are colorless are ones which are never "marked" or "painted". In such systems, it is not possible to fill with a non-colorless background color and then designate certain pixels as colorless.

Figure 2:
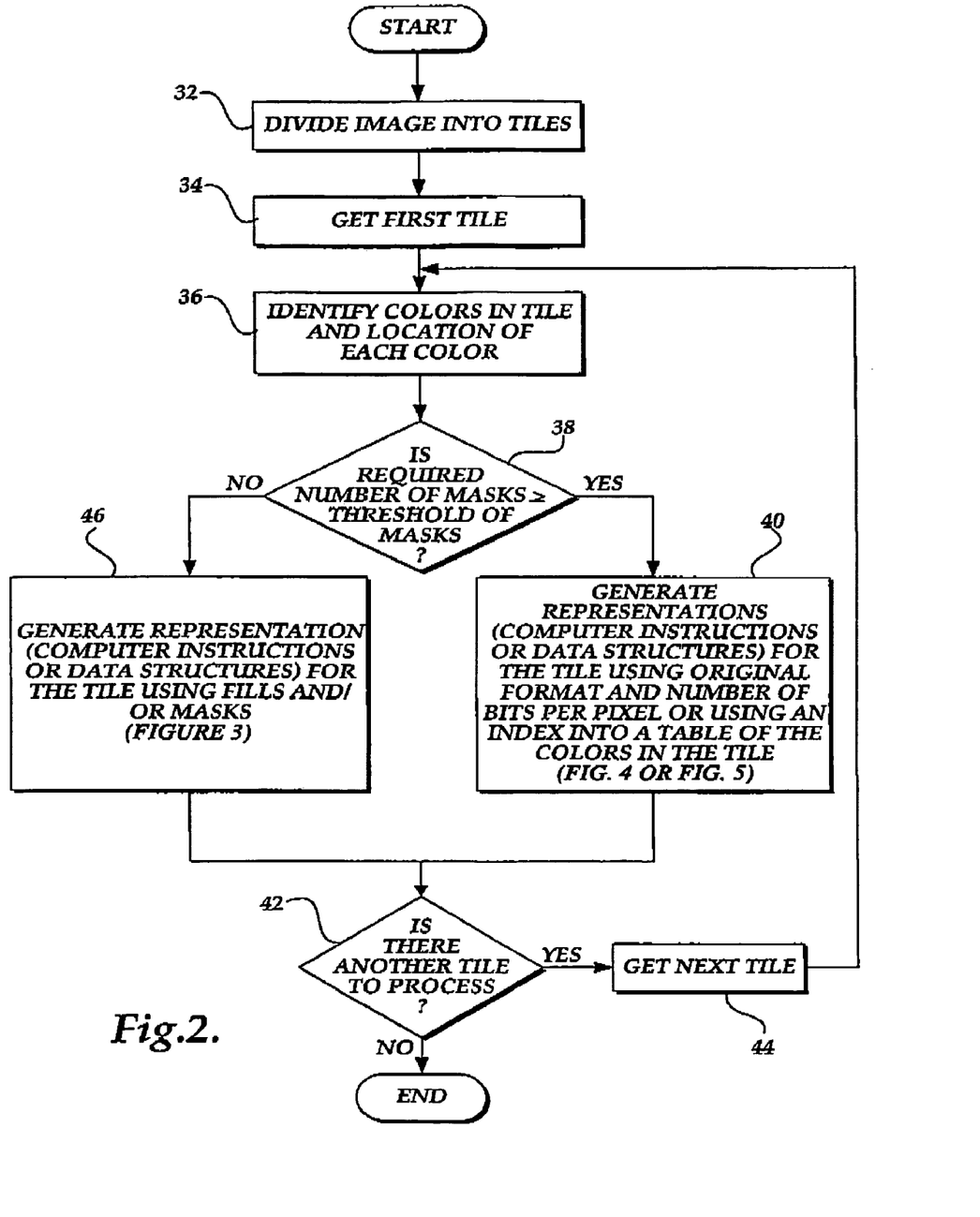
FIG. 2 is a flow diagram illustrating the logic of the present invention.

FIG. 2 is a flow diagram that illustrates the logic of the data reduction program 27 of the present invention as implemented by the processing unit 24. Beginning at a step 32, an image is divided into tiles or blocks such that each tile represents a portion of the overall image. This can be accomplished in a predetermined fashion or in a dynamic fashion based on the tile content. For example, the tiles may be uniformly sized. However, it will be appreciated by those skilled in the art and others that the tile size can be varied from tile to tile. Furthermore, the number of tiles into which the image is divided can also vary and depends primarily upon the number of colors represented in each tile. The purpose of dividing the image into tiles is to create smaller areas with fewer colors that, therefore, need less data to represent the image than required by the original raster content.

At a step 34, a first tile is retrieved. Then, the colors in the tile are identified. See step 36. This can be accomplished in a variety of ways as those skilled in the art and others will appreciate. In one embodiment, an array is provided which includes, for each color in the total image, a counter for the number of pixels for that color as well as elements for storing the minimum and maximum horizontal and vertical coordinates of pixels of that color in the tile. Each pixel in the tile is analyzed such that every time a pixel of a particular color is found, the counter and minimum and maximum coordinates for that particular color are updated. Assuming that the counters are initially set to a "0" value, if a counter has a positive value after analyzing the pixels in the tile, then it is known that the color represented by such counter is present in the tile. Thus, the colors in each tile are tracked. Alternatively, as will also be appreciated by those skilled in the art and others, if a simplified algorithm is desired, the colors in the tile can be identified by setting a flag to indicate merely the presence of a particular color in the tile.

As yet another alternative, if the number of bits per pixel (e.g., 32) is such that an array would be excessively large, then a sorted list can be maintained. Once the number of colors in the list equals or exceeds the threshold number of masks, the generation of the list may be aborted and the tile represented using the original format and number of bits per pixel or using an index for the tile (as distinct from the entire image). If this embodiment is implemented, the alternative embodiments (described below) that permit the identification of minimally sized areas within the tile can only be implemented if the tile is completely analyzed, but require a modification because complete information about all the colors in the tile and the maximum and minimum horizontal and vertical coordinates for each color in the tile need to be identified for those embodiments.

At a step 38, a test is made to determine whether the required number of masks is greater than or equal to some threshold number of masks. The required number of 1-bit masks to represent the image is logically determined by 1) the colors of the pixels in the tile together with 2) a decision by the user of the system, or predetermined as a fixed condition of the system, as to whether or not to use fills for background colors when possible. More specifically, let n denote the number of colors in the tile; let t be 0 if there is no default color or, if there is a default, there are no default-colored pixels in the tile; let t be 1 if there is a default color and there are default-colored pixels in the tile; and let f be 0 if fill operations are not to be used for background colors and 1 if they are. Then, the required number of masks for a tile is n-(t|f) where "|" represents the bitwise logical "or" operation. That is, if either there is both a default color and default-colored pixels in the tile, or if fill operations are to be used, then the number of masks is n-1. Otherwise, the required number is n.

The threshold number of masks might be set equal to the original number of bits per pixel required to represent the entire image as provided in the original raster content. Essentially, a determination is being made at a step 38 regarding whether a data volume savings can be made for this tile using the masks. However, the threshold number of masks is preferably set to some number less than the original number of bits per pixel either to satisfy a certain level of data volume savings or if an indexed representation would be more effective. For example, a user could decide that although the tile is originally represented by 8 bits per pixel, a satisfactory data reduction would involve using no more than 4 bits per pixel to represent the tile, i.e. 4 masks. Thus, the user would select the threshold number of masks to equal 5. It will be appreciated by those skilled in the art and others that the threshold number of masks can be hard-coded into the algorithm or user-defined as a user input or system configuration setting, or varied dynamically depending on the size and/or contents of the tile.

If the answer to the test at step 38 is yes, meaning that no data savings or no satisfactory level of data savings can be achieved by utilizing masks to represent the tile, then a representation for the tile is generated using the original format and number of bits per pixel or using an index which uses fewer bits than the original number. See step 40. Generating such a representation by using either computer instructions, image description operators, or data structures is well-known in the art and thus will not be described in any further detail here. With respect to the option of indexing, if the number of colors in the tile were less than or equal to 16, then a 4-bit index would be sufficient to represent each pixel and would result in a data savings if it is less than the original number of bits per pixel. If the number of colors were less than or equal to 256, an 8-bit index would suffice. Indexed representations are well understood by those skilled in the art and others.

On the other hand, if the answer to the test at step 38 is no, meaning that a particular level of data savings can be achieved using masks, then a representation is generated for the tile using "fills" and/or "masks" as will be described in further detail with reference to FIG. 3. See step 46.

After either step 40 or 46, another test is made at a step 42 to determine whether there is another tile to process. If there is another tile to process, the next tile is retrieved at a step 44 and the process described above is repeated as shown in FIG. 2 using the next tile. If there are no other tiles to analyze, the process ends.

Figure 3:
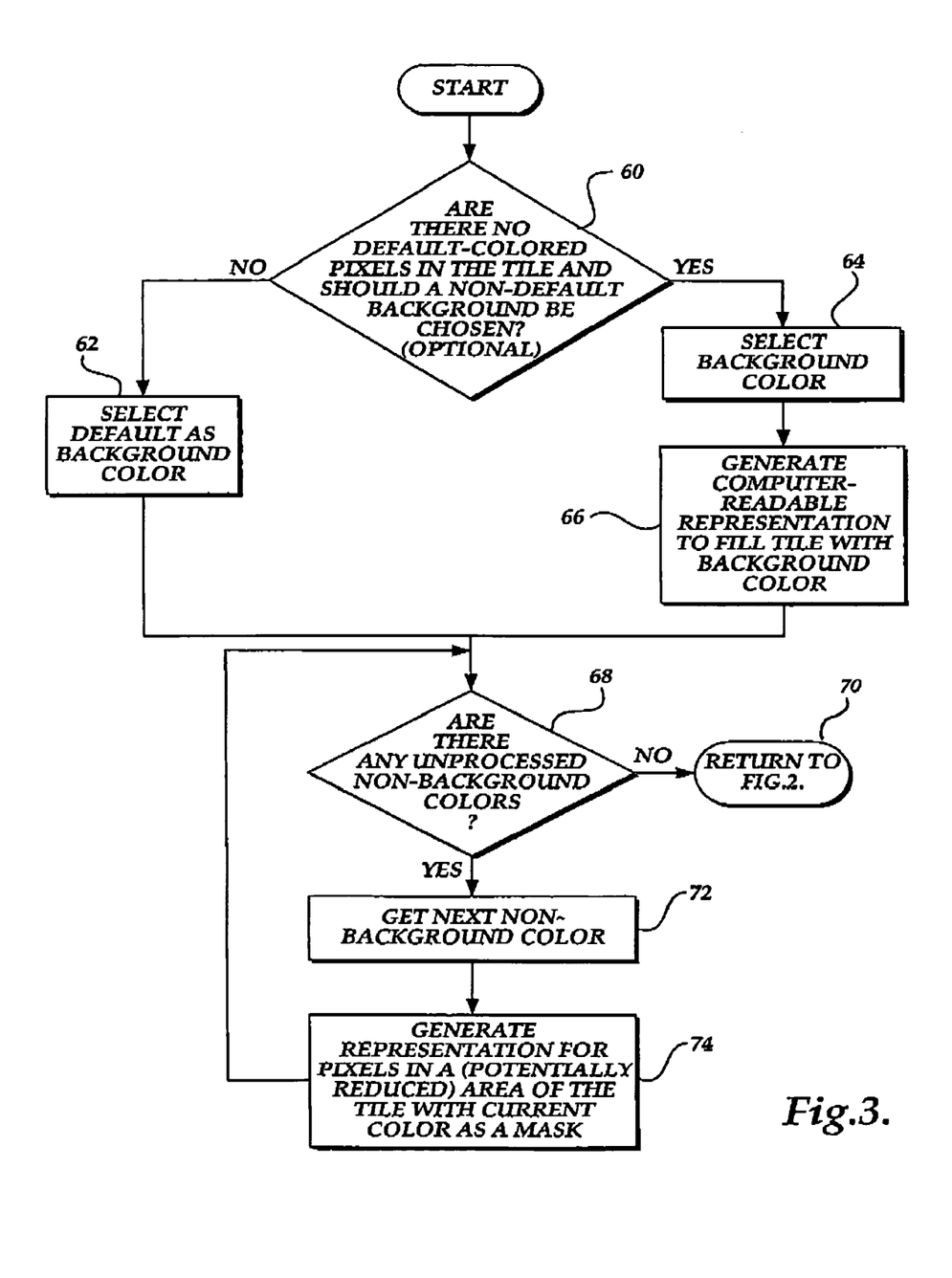
FIG. 3 is a flow diagram illustrating how the tiles are represented using fills and/or masks.

FIG. 3 is a flow diagram illustrating how tiles are represented using fills and/or masks as required in step 46 of FIG. 2. In particular, beginning at a step 60, a two-part test is made to determine whether both of the following conditions have been met: 1.) whether there are no default-colored pixels in the tile and 2.) whether a non-default background for the tile should be chosen. If the answer to either condition is no, meaning that either the tile includes default-colored pixels or that a non-default background should not be chosen, the default color is selected as the background color for the tile at a step 62. Beyond the mere selection of the default as the background color for the tile, no data is necessary to represent the default background.

On the other hand, if the answer to the test at step 60 is yes, meaning that both of the conditions have been met, i.e., there are no default-colored pixels in the tile and a non-default background should be selected, a non-default background color is selected at a step 64. The choice of the background color could be arbitrary from among the colors in the tile. However, it will be appreciated by those skilled in the art and others that the choice of the background color could be based upon some criterion. For example, a mask for each of the colors in the tile could be calculated, as will be described in further detail below, and this data could then be compressed. The color of the mask that compresses the least could then be chosen as the background color. Alternatively, the color which has the greatest number of pixels in the tile, or for which the bounding rectangle is largest, could be determined and selected as the background color. This determination could be made by examining the counters associated with the array of potential colors available for the tile. In any case, once the non-default background color is selected, a computer-readable representation is generated to fill the tile with the non-default background color at a step 66.

It will further be appreciated by those skilled in the art and others that step 60 is optional. Instead of performing the test indicated in step 60 (that is, removing step 60 entirely), the algorithm can be hard-coded to automatically select the default color as the background, or if the default color (e.g. white) is renderable, to select even some other color as the background color. Alternatively, the algorithm can simply be hard-coded to select any color identified in the tile as the background color either arbitrarily or based upon some criterion such as those described above with reference to step 64. In the latter situation, if renderable default-colored pixels are in the tile and a non-default background color is chosen, a mask would have to be generated for the default color, meaning that more data than necessary might be required to represent the tile since the default color typically does not need to be imaged. As yet another alternative, steps 60–66 can be eliminated altogether such that there is no background color chosen and processing continues as described below such that the tile is represented using only masks if a data savings was deemed worthwhile.

It will further be appreciated by those skilled in the art and others that, in accordance with an alternative embodiment of the invention, instead of testing whether there are no default-colored pixels and whether a non-default background color should be chosen before actually selecting the background color, other various criterion can be used to select the background color. For example, in one embodiment, the test could query whether there are only a few renderable default-colored pixels in the tile. If there are only a few, then a non-default background is selected and a representation is generated to fill the tile with the selected non-default background color as described above. However, if there are a large number of default-colored pixels in the tile, the default is selected as the background color. In another embodiment, the test could simply query whether there are any default-colored pixels in the tile without testing whether a non-default background should be chosen. In this case, if there are no default-colored pixels in the tile, a non-default background will be selected. If there are any default-colored pixels, the default is selected as the background color.

Returning to FIG. 3, after either step 62 or step 66, a test is made to determine whether there are any unprocessed non-background colors in the tile. See step 68. If the answer is no, processing returns to FIG. 2. See step 70. In particular, if this happens at the first entry to block 68, then the tile is entirely the background color. In this case, if the tile is the default color, no data is necessary to represent the tile as described above and, thus, the tile most certainly requires far fewer bits per pixel than originally required for that area in the image. If the tile is a solid non-default color, bits necessary to identify the color and the tile boundaries and to fill that tile with the identified color are still far fewer than the original number of bits per pixel for that area of the image provided the tile is not too small. Thus, in either case, a data volume savings is achieved.

If the answer to the test at step 68 is yes, a non-background color is identified at a step 72. Then, at a step 74, a representation is generated for identifying the pixels in an area of the tile with the current color as a 1-bit-per-pixel mask. The mask identifies which pixels within an identified boundary are to be rendered with the identified color. In one embodiment, the area of the mask is defined by the boundaries of the tile and, thus, the mask applies to the entire tile. In an alternative embodiment, the area in the tile for which the mask is provided can be minimized by determining the minimal area in which the current color is located. This is accomplished by determining the minimum and maximum horizontal and vertical coordinates in the tile where the current color is located. Using the resulting information, the boundaries of the minimal area can be determined as those skilled in the art and others will appreciate. As a result, the mask for the current color can be provided in the identified minimal area only. As an example, if you had a circle of diameter 200 pixels in a square tile of 500 pixels, instead of storing a mask with a 1-bit-per-pixel mask for 500 by 500 pixels you can store only the information for the smallest square containing the circle, i.e., 1-bit-per-pixel for 200 by 200 pixels plus the information about the position of the mask within the larger square.

After the representations have been generated for identifying the pixels in an area of the tile with the current color as a mask, processing returns to step 68 to determine whether there are any more unprocessed non-background colors and the process described above is repeated as shown in FIG. 3 and as described above. In particular, if there are more unprocessed non-background colors, a next non-background color is identified at step 72 and a mask is generated. This occurs until all non-background colors have been processed.

Figure 4:
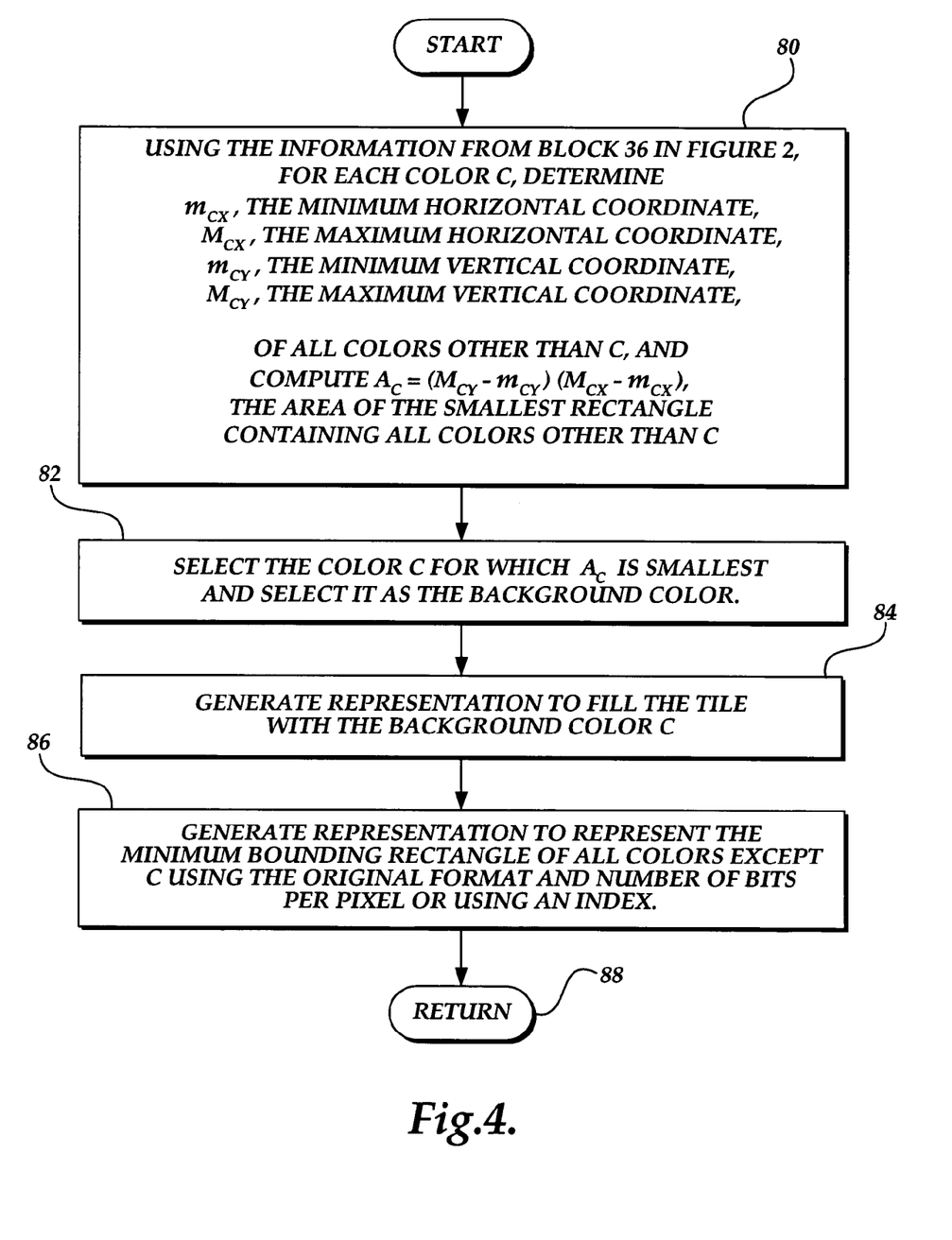
FIG. 4 is a flow diagram illustrating alternative logic for representing a tile with its original number of bits per pixel or a smaller index.

FIG. 4 illustrates how generating a representation for a tile using the original format and number of bits per pixel or using a smaller index, as required at step 40 of FIG. 2, can alternatively be accomplished in accordance with another embodiment of the present invention. In general, instead of generating a representation providing the tile boundaries and the original number of bits per pixel or providing a smaller index for the area in the image corresponding to the designated tile area, the tile can be represented by identifying a background color for the entire tile, identifying boundaries for a minimal area in the tile in which the remaining colors are contained, and utilizing the original format and number of bits per pixel or a smaller index for the identified minimal area only. For example, if the many-colored content is only located in a corner of the tile, this corner area can be identified so that the original number of bits per pixel or smaller index need only be used for this minimal area. If the rest of the tile is the default color, no further data need be provided. On the other hand, if the rest of the tile is some other color, a representation providing the color and tile boundaries and requesting that the tile be filled with the identified color is also generated. As a result, although a data saving could not be achieved using masks, some data savings is still achieved beyond representing the tile with all of its original number of bits per pixel.

Provided that either there are no default-colored pixels in the tile or the default color is renderable, then as shown in FIG. 4, a calculation is made at a step 80 to determine the color which, if chosen as a background color for the tile, would cause the remaining colors to be located in the smallest sized rectangular area within the tile. This is accomplished by determining for each potential background color (i.e., for each of the colors identified in the tile) the maximum and minimum horizontal and vertical coordinates in the tile in which the remaining colors are located. The potential background color that produces the smallest rectangular area defined by the maximum and minimum horizontal and vertical coordinates is chosen as the background color for the tile. See step 82. Then, at a step 84, a representation is generated to fill the tile with the selected background color. Additionally, a representation is generated utilizing the original format and number of bits per pixel or a smaller index to represent the remaining colors in the image within the identified minimal rectangular area of the tile only. See step 86. Then, processing returns at a step 88 to FIG. 2.

Figure 5:
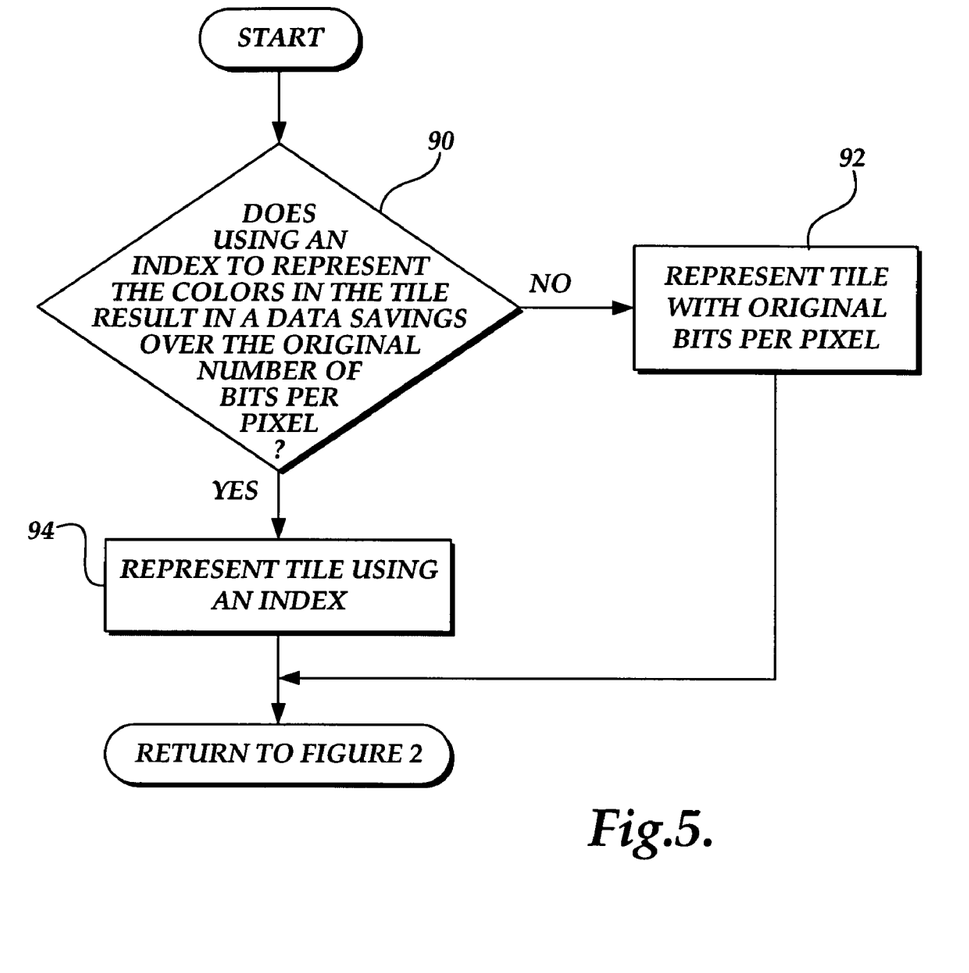
FIG. 5 is a flow diagram illustrating yet further alternative logic for representing a tile with its original number of bits per pixel or a smaller index.

FIG. 5 illustrates another alternative embodiment for the method of generating a representation for a tile using the original format and number of bits per pixel or using a smaller index, as required at step 40 of FIG. 2. As shown at a step 90 of FIG. 5, a test is made to determine whether using an index to represent the colors in the tile results in a data savings over the original number of bits per pixel. If the answer to this test is yes, then the colors in the tile are represented using an index at step 94. If the answer to this test is no, the tile is represented with the original bits per pixel at a step 92. Then, at block 96, processing returns to FIG. 2.

Figure 6:
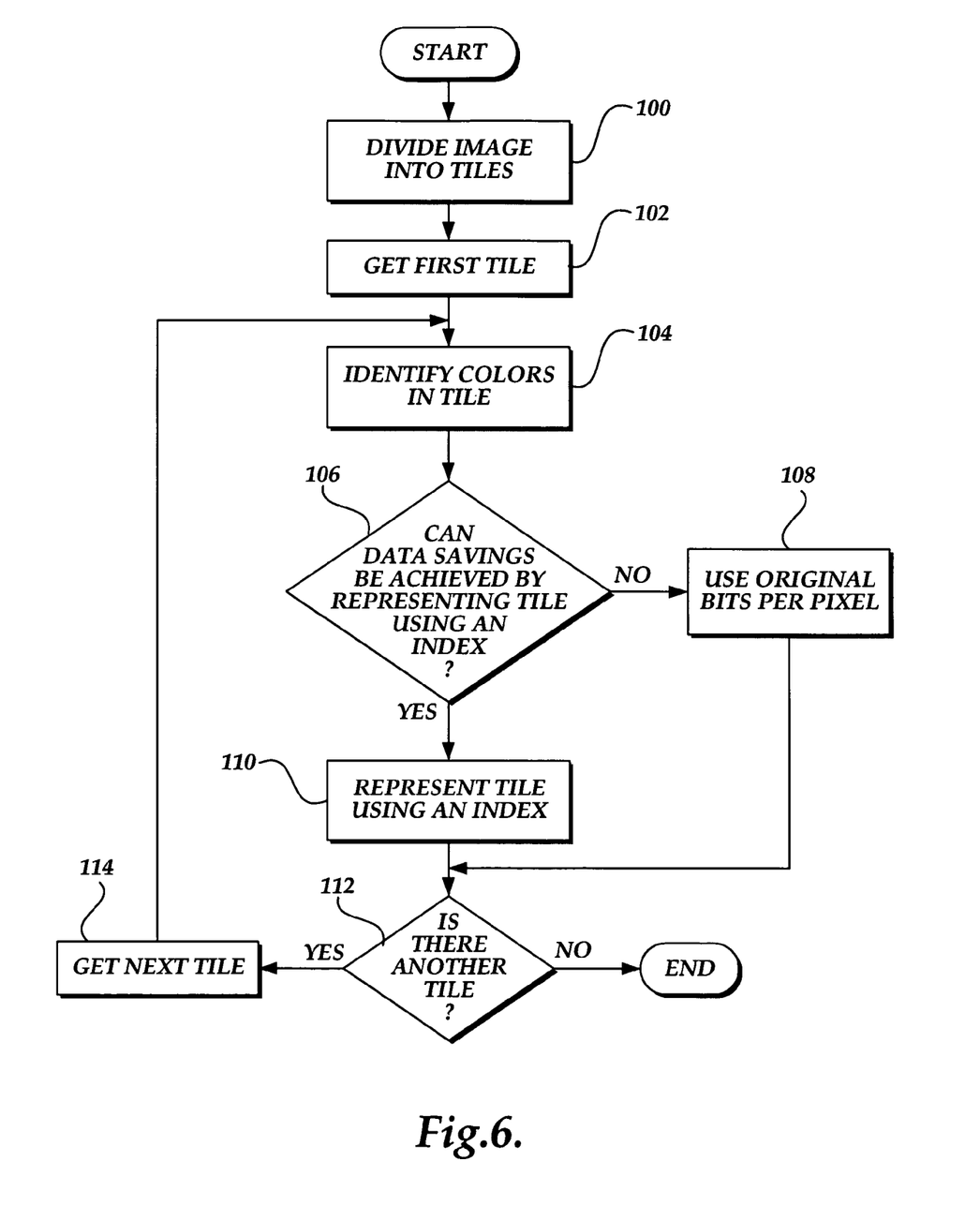
FIG. 6 is a flow diagram illustrating alternative logic to that shown in FIG. 2.

FIG. 6 is a flow diagram illustrating alternative logic to that shown in FIG. 2. In general, rather than determining whether the required number of masks is greater than or equal to the threshold number of masks, a test is made to determine whether a data savings can be achieved simply by using an index for the tile. In particular, as shown in FIG. 6, the image is first divided into tiles at a step 100. Then at a step 102, a first tile is retrieved. Next, the colors in this tile are identified at a step 104, and a test is made at a step 106 to determine whether a data savings can be achieved by representing the tile using an index. If the answer to the test at step 106 is no, the original bits per pixel are used to represent the tile. See step 108. On the other hand, if the answer to the test at step 106 is yes, the colors in the tile are represented with an index at a step 110. After either step 108 or 110, another test is made at a step 112 to determine whether there is another tile to process. If there is another tile to process, the next tile is retrieved at a step 114 and the process described above is repeated as shown in FIG. 6 using the next tile. If there are no other tiles to analyze, the process ends.

As will be readily appreciated by those skilled in the art and others, a data reduction method in accordance with the present invention has a number of advantages. By reducing the number of bits required to represent the image to less than originally required, the file containing the image can be more easily stored and processed to render the image. In many cases, it makes rendering the image possible. In other cases, it speeds up the processing time.

While the preferred embodiment of the invention has been illustrated and described, it will be appreciated that various changes can be made therein without departing from the spirit and scope of the invention. For example, besides applying the above processes to an image containing both continuous tone and linework data, the processes can be applied to any type of image or portions of an image to thereby reduce the data volume required to represent it. As another example, if the threshold were set to one less, then the comparison of the required number of masks to the threshold number would change from "greater than or equal to" to simply "greater than".

The embodiments of the invention in which an exclusive property or privilege is claimed are defined as follows:

1. A method of reducing the volume of data representing an image, the image represented by a plurality of pixels, each pixel encoded by an original number of bits, said method comprising:
   (a) dividing the image into a plurality of tiles;
   (b) for each tile:
      (i) identifying the colors represented in the tile;
      (ii) identifying a required number of masks to represent the colors;
      (iii) comparing the required number of masks with a threshold number of masks;
      (iv) if the required number of masks is less than the threshold number of masks, generating computer-readable instructions to represent the tile using one or more techniques selected from a group consisting of fills and masks.

2. The method of claim 1 further comprising: for each tile: if the required number of masks is greater than or equal to the threshold number of masks, generating computer-readable instructions to represent the tile using the original number of bits per pixel or a smaller index.

3. The method of claim 2, wherein generating computer-readable instructions to represent the tile using the original number of bits per pixel or a smaller index comprises:
   (a) determining the color in the tile which, if chosen as a background color, causes the remaining colors in the tile to be located in the smallest rectangular area in the tile;
   (b) selecting the color identified in (a) as the background color for the tile;
   (c) generating computer-readable instructions to represent the smallest rectangular area in the tile with the original bits per pixel or an index.

4. The method of claim 3 further comprising generating computer-readable instructions to fill the tile with the background color if the background color is not the default color.

5. The method of claim 2, wherein generating computer-readable instructions to represent the tile using the original number of bits per pixel or a smaller index comprises:
   (a) determining whether a data savings is achieved if an index is used to represent the tile;
   (b) if a data savings is not achieved, generating computer-readable instructions representing the tile with the original bits per pixel.

6. The method of claim 1, wherein the threshold number of masks equals the original number of bits per pixel representing the image.

7. The method of claim 1, wherein the threshold number of masks is user-defined as a user input or system configuration.

8. The method of claim 1, wherein the threshold number of masks is a fixed number less than the original number of bits per pixel.

9. The method of claim 1, wherein generating computer-readable instructions to represent a tile comprises:
   (a) determining whether there are no default-colored pixels in the tile and whether a non-default background should be chosen for the tile;
   (b) if there are default-colored pixels in the tile or if a non-default background should not be chosen, selecting the default color as the background color for the tile;
   (c) if there are not default-colored pixels in the tile and a non-default background should be chosen, selecting a non-default color for the background and generating computer-readable instructions to fill the tile with the selected non-default background color;
   (d) determining whether there are any non-background colors in the tile;
   (e) if there are any non-background colors:
      (i) selecting a non-background color;
      (ii) generating computer readable instructions to represent the pixels in an area of the tile with the selected non-background color as a mask;
      (iii) repeating steps (i) and (ii) for each additional, if any, non-background color.

10. The method of claim 9, wherein the area of the tile represented with the selected non-background color as a mask is the entire area of the tile.

11. The method of claim 9, wherein the area of the tile represented with the selected non-background color as a mask is a minimal area within the tile in which the non-background color is located.

12. The method of claim 11, wherein the minimal area within the tile in which the non-background color is located is a rectangular area determined by the minimum and maximum x and y values in the tile for the non-background color.

13. The method of claim 1, wherein generating computer-readable instructions to represent a tile comprises:
   (a) selecting a background color;
   (b) if the background color needs to be rendered, generating computer-readable instructions to fill the tile with the selected background color; and
   (c) for each non-background color, if any, in the tile, generating computer-readable instructions to represent the pixels in an area of the tile with the non-background color as a mask.

14. The method of claim 13, wherein the background color is selected arbitrarily from the colors identified in the tile.

15. The method of claim 13, wherein the background color is the color which has the greatest number of pixels in the tile.

16. The method of claim 13, wherein the background color is the color for which the rectangle bounding the pixels of that color within the tile is the largest.

17. The method of claim 13, wherein the background color is the color identified in the tile which, when represented as a mask, compresses the least.

18. The method of claim 1, wherein generating computer-readable instructions to represent a tile comprises;
   for each renderable color in the tile, generating computer-readable instructions to represent the pixels in an area of the tile with the renderable color as a mask.

19. A method of reducing the volume of data representing a digital image, the digital image comprising a plurality of pixels, each pixel represented by an original number of data bits, the method comprising;
   (a) dividing the image into a plurality of tiles;
   (b) for each tile:
      (i) identifying the colors represented in the tile;
      (ii) identifying a required number of masks to represent the colors;
      (iii) comparing the required number of masks with a threshold number;

(iv) if the required number of masks is less than the threshold number of masks,
  (A) selecting a background color;
  (B) if the background color needs to be rendered, generating computer-readable instructions to fill the tile with the selected background color;
  (C) determining whether there are any non-background colors in the tile; and
  (D) if there are any non-background color in the tile:
    (1) selecting a non-background color;
    (2) generating computer-readable instructions to represent the pixels in an area of the tile with the selected non-background color as a mask; and
    (3) repeating (D)(1)–(D)(2) for each additional non-background color.

20. The method of claim 19 further comprising: for each tile:
if the required number of masks is greater than or equal to the threshold number of masks, generating computer-readable instructions to represent the tile using the original number of bits per pixel or a smaller index.

21. The method of claim 20, wherein generating computer-readable instructions to represent the tile using the original number of bits per pixel or a smaller index comprises:
  (a) determining the color in the tile which, if chosen as a background color, causes the remaining colors in the tile to be located in the smallest rectangular area in the tile;
  (b) selecting the color identified in (a) as the background color for the tile;
  (c) generating computer-readable instructions to represent the smallest rectangular area in the tile with the original bits per pixel or an index.

22. The method of claim 21 further comprising generating computer-readable instructions to fill the tile with the background color if the background color is not the default color.

23. The method of claim 20, wherein generating computer-readable instructions to represent the tile using the original number of bits per pixel or a smaller index comprises:
  (a) determining whether a data savings is achieved if an index is used to represent the tile;
  (b) it a data savings is not achieved, generating computer-readable instructions representing the tile with the original bits per pixel.

24. The method of claim 19, wherein the area of the tile represented with the selected non-background color as a mask is the entire area of the tile.

25. The method of claim 19, wherein the area of the tile represented with the selected non-background color as a mask is a minimal area within the tile in which the non-background color is located.

26. The method of claim 25, wherein the minimal area within the tile in which the non-background color is located is a rectangular area determined by the minimum and maximum x and y values in the tile for the non-background color.

27. A method of reducing the volume of data representing a digital image, the digital image comprising a plurality of pixels, each pixel represented by an original number of data bits, the method comprising:
  (a) dividing the image into a plurality of tiles;
  (b) for each tile;
    (i) identifying the colors represented in the tile;
    (ii) identifying a required number of masks to represent the colors;
    (iii) comparing the required number of masks with a threshold number of masks;
    (iv) if the required number of masks is less than the threshold number of masks, generating computer-readable instructions to represent the tile with each of the identified colors as a mask.

28. The method of claim 27 further comprising: for each tile:
if the required number of masks is greater than or equal to the threshold number of masks, generating computer-readable instructions to represent the tile using the original number of bits per pixel or a smaller index.

29. The method of claim 28, wherein generating computer-readable instructions to represent the tile using the original number of bits per pixel or a smaller index comprises;
  (a) determining the color in the tile which, if chosen as a background color, causes the remaining colors in the tile to be located in the smallest rectangular area in the tile;
  (b) selecting the color identified in (a) as the background color for the tile;
  (c) generating computer-readable instructions to represent the smallest rectangular area in the tile with the original bits per pixel or an index.

30. The method of claim 29 further comprising generating computer-readable instructions to fill the tile with the background color if the background color is not the default color.

31. The method of claim 28, wherein generating computer-readable instructions to represent the tile using the original number of bits per pixel or a smaller index comprises:
  (a) determining whether a data savings is achieved if an index is used to represent the tile;
  (b) if a data savings is not achieved, generating computer-readable instructions representing the tile with the original bits per pixel.

32. The method of claim 27, wherein the area of the tile represented with the selected non-background color as a mask is the entire area of the tile.

33. The method of claim 27, wherein the area of the tile represented with the selected non-background color as a mask is a minimal area within the tile in which the non-background color is located.

34. The method of claim 33, wherein the minimal area within the tile in which the non-background color is located is a rectangular area determined by the minimum and maximum x and y values in the tile for the non-background color.

35. A method of reducing the volume of data representing an image, the image represented by a plurality of pixels, each pixel encoded by an original number of bits, said method comprising;
  (a) dividing the image into a plurality of tiles;
  (b) for each tile:
    (i) identifying the colors represented in the tile;
    (ii) identifying a required number of masks to represent the colors;
    (iii) determining whether a data savings can be achieved by using masks to represent the tile; said data savings determination based on the required number of masks and a threshold number of masks;
    (iv) if a data savings is possible,
      (A) selecting a background color;
      (B) if the background color needs to be rendered, generating computer-readable instructions to fill the tile with the selected background color;

(C) determining whether there are any non-background colors in the tile; and
(D) if there are any non-background colors in the tile:
   (1) selecting a non-background color;
   (2) generating computer-readable instructions to represent the pixels in an area of the tile with the selected non-background color as a mask; and
   (3) repeating (D) (1)–(D) (2) for any additional non-background color, if any, in the tile.

36. A method of reducing the volume of data representing an image, the image represented by a plurality of pixels, each pixel encoded by an original number of bits, said method comprising:
(a) dividing the image into a plurality of tiles;
(b) for each tile:
   (i) identifying the colors represented in the tile;
   (ii) identifying a required number of masks to represent the colors;
   (iii) determining whether a data savings can be achieved by using masks to represent the tile, said data savings determination based on the required number of masks and a threshold number of masks;
   (iv) if a data savings is possible,
      (A) selecting a color in the tile;
      (B) generating computer-readable instructions to represent the pixels in an area of the tile with the selected color as a mask;
      (C) repeating steps (A)–(B) for each additional identified color, if any, in the tile.

37. A method of reducing the volume of data representing an image, the image represented by a plurality of pixels, each pixel encoded by an original number of bits, said method of comprising:
(a) dividing the image into a plurality of tiles;
(b) for each tile;
   (i) identifying the colors represented in the tile;
   (ii) determining whether a data savings is achievable using an index to represent the colors in the tile; and
   (iii) if a data savings is achievable, representing the tile using an index.

38. The method of claim 37, further comprising: for each tile:
if a data savings is not achievable, using the original data bits to represent the tile.

39. A system for reducing the volume of data representing an image, the image represented by a plurality of pixels, each pixel encoded by an original number of bits, said system comprising:
a processing unit; and
a storage medium coupled to the processing unit, the storage medium storing computer-readable program code implemented by the processor for:
(a) dividing the image into a plurality of tiles;
(b) for each tile:
   (i) identifying the colors represented in the tile;
   (ii) identifying a required number of masks to represent the colors;
   (iii) comparing the required number of masks with a threshold number of masks;
   (iv) if the required number of masks is less than the threshold number of masks, generating computer-readable instructions to represent the tile using one or more techniques selected from a group consisting of fills and masks.

40. A system for reducing the volume of data representing a digital image, the digital image comprising a plurality of pixels, each pixel represented by an original number of data bits, the system comprising:
a processing unit; and
a storage medium coupled to the processing unit, the storage medium storing computer-readable program code implemented by the processor for:
(a) dividing the image into a plurality of tiles;
(b) for each tile:
   (i) identifying the colors represented in the tile;
   (ii) identifying a required number of masks to represent the colors;
   (iii) comparing the required number of masks with a threshold number;
   (iv) if the required number of masks is less than the threshold number of masks,
      (A) selecting a background color;
      (B) if the background color needs to be rendered, generating computer-readable instructions to fill the tile with the selected background color;
      (C) determining whether there are any non-background colors in the tile; and
      (D) if there are any non-background color in the tile:
         (1) selecting a non-background color;
         (2) generating computer-readable instructions to represent the pixels in an area of the tile with the selected non-background color as a mask; and
         (3) repeating (D)(1)–(D)(2) for each additional non-background color.

41. A system for reducing the volume of data representing a digital image, the digital image comprising a plurality of pixels, each pixel represented by an original number of data bits, the system comprising:
a processing unit; and
a storage medium coupled to the processing unit, the storage medium storing computer-readable program code implemented by the processor for:
(a) dividing the image into a plurality of tiles;
(b) for each tile:
   (i) identifying the colors represented in the tile;
   (ii) identifying a required number of masks to represent the colors;
   (iii) comparing the required number of masks with a threshold number of masks;
   (iv) if the required number of masks is less than the threshold number of masks, generating computer-readable instructions to represent the tile with each of the identified colors as a mask.

42. A system for reducing the volume of data representing an image, the image represented by a plurality of pixels, each pixel encoded by an original number of bits, said method comprising:
a processing unit; and
a storage medium coupled to the processing unit, the storage medium storing computer-readable program code implemented by the processor for:
(a) dividing the image into a plurality of tiles;
(b) for each tile:
   (i) identifying the colors represented in the tile;
   (ii) identifying a required number of masks to represent the colors;
   (iii) determining whether a data savings can be achieved by using masks to represent the tile; said data savings determination based on the required number of masks and a threshold number of masks;
(iv) if a data savings is possible,
  (A) selecting a background color;
  (B) if the background color is needs to be rendered, generating computer-readable instructions to fill the tile with the selected background color;
  (C) determining whether there are any non-background colors in the tile; and
  (D) if there are any non-background colors in the tile:
    (1) selecting a non-background color;
    (2) generating computer-readable instructions to represent the pixels in an area of the tile with the selected non-background color as a mask; and
    (3) repeating (D)(1)–(D)(2) for any additional non-background color, if any, in the tile.

43. A system for reducing the volume of data representing an image, the image represented by a plurality of pixels, each pixel encoded by an original number of bits, said system comprising:
  a processing unit; and
  a storage medium coupled to the processing unit, the storage medium storing computer-readable program code implemented by the processor for:
(a) dividing the image into a plurality of tiles;
(b) for each tile:
  (i) identifying the colors represented in the tile;
  (ii) identifying a required number of masks to represent the colors;
  (iii) determining whether a data savings can be achieved by using masks to represent the tile, said data savings determination based on the required number of masks and a threshold number of masks;
  (iv) if a data savings is possible,
    (A) selecting a color in the tile;
    (B) generating computer-readable instructions to represent the pixels in an area of the tile with the selected color as a mask;
    (C) repeating steps (A)–(B) for each additional identified color, if any, in the tile.

44. A system for reducing the volume of data representing an image, the image represented by a plurality of pixels, each pixel encoded by an original number of bits, said system comprising:
  a processing unit; and
  a storage medium coupled to the processing unit, the storage medium storing computer-readable program code implemented by the processor for:
(a) dividing the image into a plurality of tiles;
(b) for each tile;
  (i) identifying the colors represented in the tile;
  (ii) determining whether a data savings is achievable using an index to represent the colors in the tile; and
  (iii) if a data savings is achievable, representing the tile using an index.

* * * * *